United States Patent

[11] 3,530,907

| [72] | Inventor | Jerome Slass |
| | | 701 Middlesex Drive, Cinnaminson, New Jersey 08077 |
| [21] | Appl. No. | 692,545 |
| [22] | Filed | Dec. 21, 1967 |
| [45] | Patented | Sept. 29, 1970 |

[54] AUTOMATIC BEVERAGE DISPENSING SYSTEM
9 Claims, 11 Drawing Figs.

[52] U.S. Cl. .................................................. 141/167, 141/174
[51] Int. Cl. ...................................................... B65b 43/42
[50] Field of Search ........................................ 141/129–174

[56] References Cited
UNITED STATES PATENTS
2,580,257  12/1951  Tacchella ..................... 141/174

*Primary Examiner*—Houston S. Bell, Jr.
*Attorney*—Morton C. Jacobs

ABSTRACT: A beverage dispensing system includes a control circuit that permits alternative selection of two modes of self-service operation. In one mode, the removal of a filled cup at a pickup station initiates a cycle in which a cup previously filled at a filling station is moved by a conveyor to the pickup station and concurrently an empty cup previously dropped at a supply station is moved to the filling station. Thereafter, when the conveyor is stationary, another empty cup is dropped at the supply station and the cup at the filling station is filled. Each time a cup is removed at the pickup station the cycle is repeated. In a manual mode, a cycle made up of the same segments is initiated by operation of a manual switch. However, the sequence starts with the cup supply and filling operations and concludes with the advancing of the filled cup to the pickup station. A selector switch transposes the control circuit to either mode.

Patented Sept. 29, 1970

INVENTOR
JEROME SLASS

BY Morton C. Jacobs
ATTORNEY

INVENTOR
JEROME SLASS

Patented Sept. 29, 1970

INVENTOR
JEROME SLASS

BY Morton C. Jacobs
ATTORNEY

AUTOMATIC BEVERAGE DISPENSING SYSTEM

This invention relates to automatic beverage dispensing systems, and particularly to such dispensing systems suitable for self-service applications.

An automatic beverage dispensing apparatus, it has been found, is needed for establishments of the cafeteria or snack-bar type that are based on self-service by their customers. Such establishments have large variations in customer demand, with peak loads during lunch hours, coffee breaks and intermissions, and relatively light demand at other times. As the load demands vary, so do the requirements for attendants to serve the customers, and it is often very inefficient in use of labor to provide an adequate staff to meet the peak time periods. Moreover, the serving of beverages can be one of the slower parts of a cafeteria type serving line during peak demand periods. For purposes of meeting the peak demand, it is customary to fill a large number of cups with beverages in advance of the demand, in order to handle the load as quickly and efficiently as possible. Such a procedure may involve substantial wastage and does not eliminate the need for attendants to prepare for the peak demand.

Accordingly, it is among the objects of this invention to provide a new and improved automatic beverage dispensing system suitable for customer self-service.

Another object is to provide a new and improved self-service automatic beverage dispensing system suitable for cafeteria-style and snack-bar establishments.

Another object is to provide a new and improved automatic beverage dispensing system which is suitable for establishments having large variations in customer demand.

In accordance with an embodiment of this invention, the automatic beverage dispensing system includes a conveyor for moving beverage cups successively from a cup-supplying station to a beverage filling station, and to a pickup station, which stations are equally spaced with respect to conveyor movement. An automatic mode of operation is established by a control circuit that includes a switch at the pickup station. The removal of the cup at the pickup station actuates a switch to initiate movement of the conveyor a distance corresponding to that between each station. When the conveyor stops, an empty cup is supplied to the conveyor at the cup-supplying station, the empty cup at the filling station is filled with beverage, and the previously filled cup is then at the pickup station for removal by a customer. This cycle is repeated each time upon the removal of the filled cup at the pickup station. Thereby, a filled cup is always available to the customer at the pickup station, and upon its removal a previously filled cup at the cup-filling station is immediately moved to the pickup station so that it likewise can be removed, whereupon the cycle is automatically repeated. For periods of low demand, a manually operative switch is provided for actuation by a customer. The control circuit is responsive to the operation of the switch for performing the same operations, but in a different sequence. That is, an empty cup is filled at the filling station and an empty cup is supplied at the supplying station, whereupon the conveyor moves the filled cup to the pickup station and the empty cup to the filling station and terminates its cycle until the manual switch is again actuated. The control circuit also includes a switch for selectively operating the system in the repeated-cycling automatic mode or in the single-cycle manual mode. The control circuit operates to perform the operations in different sequences in the different modes.

The foregoing and other objects of this invention, the features thereof, as well as the invention itself, may be more fully understood from the following description when read together with the accompanying drawing, in which.

In the drawing, corresponding parts are referenced throughout by similar numerals.

Figure 11:
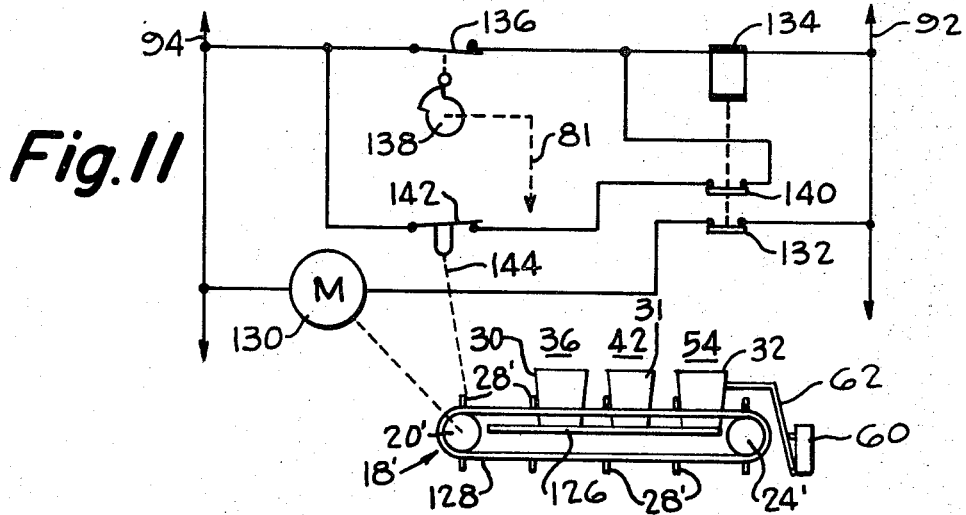
FIG. 11 is a schematic circuit diagram of a portion of a modification of the controls of FIG. 3.

Automatic beverage dispensing apparatus embodying this invention includes a housing 10 having a front panel 12, a rear panel 14, and a base 16. Side and top panels and other details of conventional construction are omitted from the drawing for simplicity of illustration and since suitable constructions therefor are well known in the art. A conveyor belt 18 is driven in a well known fashion by a sprocket wheel 20 mounted on an axle 22 at the lower rear of the housing, and around an idler 24 mounted on an axle 26 adjacent the lower front of the housing. The conveyor belt 18 may be of any suitable construction, and preferably includes uniformly spaced divider and cup-pusher bars 28 projecting outwardly from the conveyor belt to provide separators for beverage cups 30—32 carried by the belt and to push the cups so as to insure proper movement of the cups with the belt in a manner well known in the art. Between each two successive dividers 28, a cup support 33 of length $d$ is formed on the conveyor. Guide rails 34 project from the rear panel 14 and extend above and on either side of the conveyor belt 18 to restrain the cups 30—32 laterally as they move with the conveyor from one operating station to the next.

At a cup-supplying station 36, a cup dispenser 38, which includes a cylinder for holding a stack of empty cups, drops an empty cup on the conveyor when a cup support 33 is positioned thereunder. The dispenser 38 may be of any suitable type, for example operated by a motor and cup-drop control 40 which is linked to the dispenser 38, to drop a single cup when actuated. At the next station, a cup-filling station 42, a spout 44 feeds beverage into cup 31 from a tank 46 via a control valve 48. Also at the filling station 42, a pivoted cup-sensing arm 50 is mounted to one side of the conveyor belt 18 and includes a lateral finger 51 projecting therefrom. The arm 50 is biased so that the finger 51 normally extends partly over the conveyor in the path of a cup 31 so as to be moved back by the cup when it is conveyed into position at station 42. The sensing arm 50 actuates an electric switch 52 between its closed and open conditions when the arm is moved between its two positions corresponding respectively to a cup 31 being present at station 42 and to the absence of such a cup.

The front panel 12 is located between the filling station 42 and a pickup station 54. The lower end of the front panel 12 is spaced above the conveyor belt 18 by the height of the largest cup used in the system, whereby the cups are conveyed under panel 12 into position at station 54. Overlying the conveyor belt 18, and spaced in front of the front panel 12 by the length $d$ or a distance corresponding to approximately the diameter of a cup, is a horizontal panel section 56, secured to the side panels and to a connecting panel 58 mounted on the base 16 and extending between the side panels. Panels 56 and 58 form a front enclosure for the conveyor, and panel 56 forms a platform on which filled cups may be placed after removal from the conveyor. A switch 60 is mounted on the inside of the connecting panel 58, where it is actuated by a pivoted, L-shaped cup-sensing arm 62, similar to arm 50, which has a finger 64 extending over the top of the conveyor belt 18 in a position to be moved by a filled cup 32 as it is conveyed into position at the pickup station 54. Mounted on the front panel 12 is an enclosure 66 which includes a push-button or other manual switch 68 and an indicator lamp 70.

Figure 2:
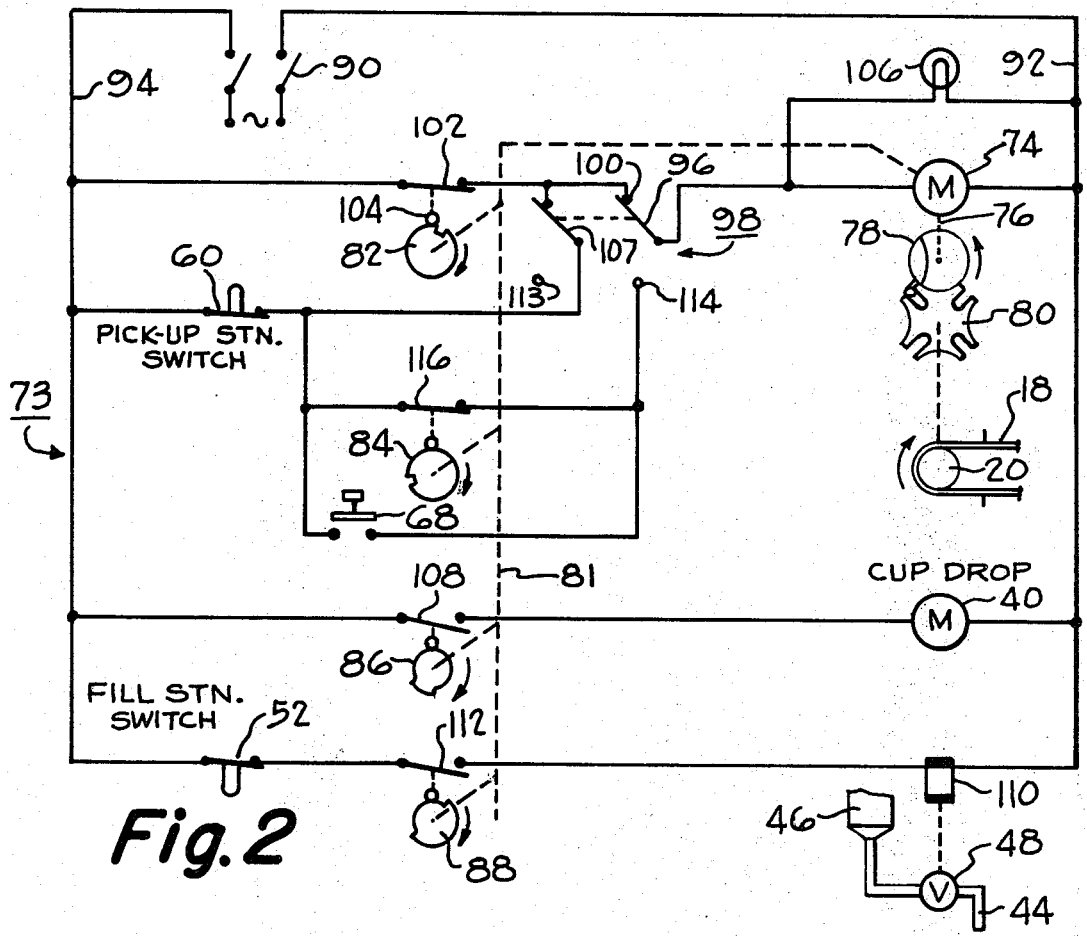
FIG. 2 is a schematic circuit and system diagram of the controls for the system of FIG. 1.

A housing 72 encloses an electric motor and drive mechanism for the conveyor sprocket wheel 20, as well as the control circuit 73 shown in FIG. 2. The latter shows the electric motor 74 connected via a shaft 76 (represented schematically by a broken gang line) to the driver 78 of a Geneva wheel 80. The Geneva shaft in turn is connected (via suitable gearing, not shown) to the sprocket 20 of the conveyor belt 18. With each quarter turn of Geneva 80, the conveyor belt is stepped a distance equal to the length d of the cup support 33, so as to move a cup from one station to the succeeding one. In the embodiment illustrated in FIG. 2, the motor 74 is also used as a timing control and drives, via a shaft 81 represented by a broken gang line, a set of four control cams 82, 84, 86, 88, which determine a control cycle of the system. The system is energized by any suitable power source (e.g. 110 v. a.c.) which is supplied via a master switch 90 and suitable fuses (not shown) to lines 92 and 94. The motor 74 is connected between the power lines 92 and 94 via the series combination of pole 96 of a double-pole, double-throw selector switch 98, fixed contact 100 thereof, and cycle switch 102 operated by cam 82 through cam follower 104. An indicator lamp 106 is connected electrically in parallel with motor 74 to be energized at the same time.

Connected across switch 102 is the series combination of normally-open cup-sensing switch 60 at the pickup station and the other pole 106 of switch 98. The cup-drop motor 40 is connected between the power lines 92 and 94 via switch 108 actuated by cam 86. A solenoid 110 for the filling valve 48 is connected between the power lines 92 and 94 via the series combination of cup-sensing switch 52 at the filling station and a switch 112 operated by cam 88. When double-pole selector switch 98 is thrown to its other position, pole 107 is left open-circuited at contact 113, and pole 96 is connected to contact 114. Thereby, the motor 74 and cup-sensing switch are connected in circuit with the parallel combination of manual switch 68 and manual cycle switch 116 operated by cam 86. The position of selector switch 98 shown in FIG. 2 is that used for the repeated-cycling automatic mode of operation, and the other switch position is for the single-cycle manual mode.

Figure 1:
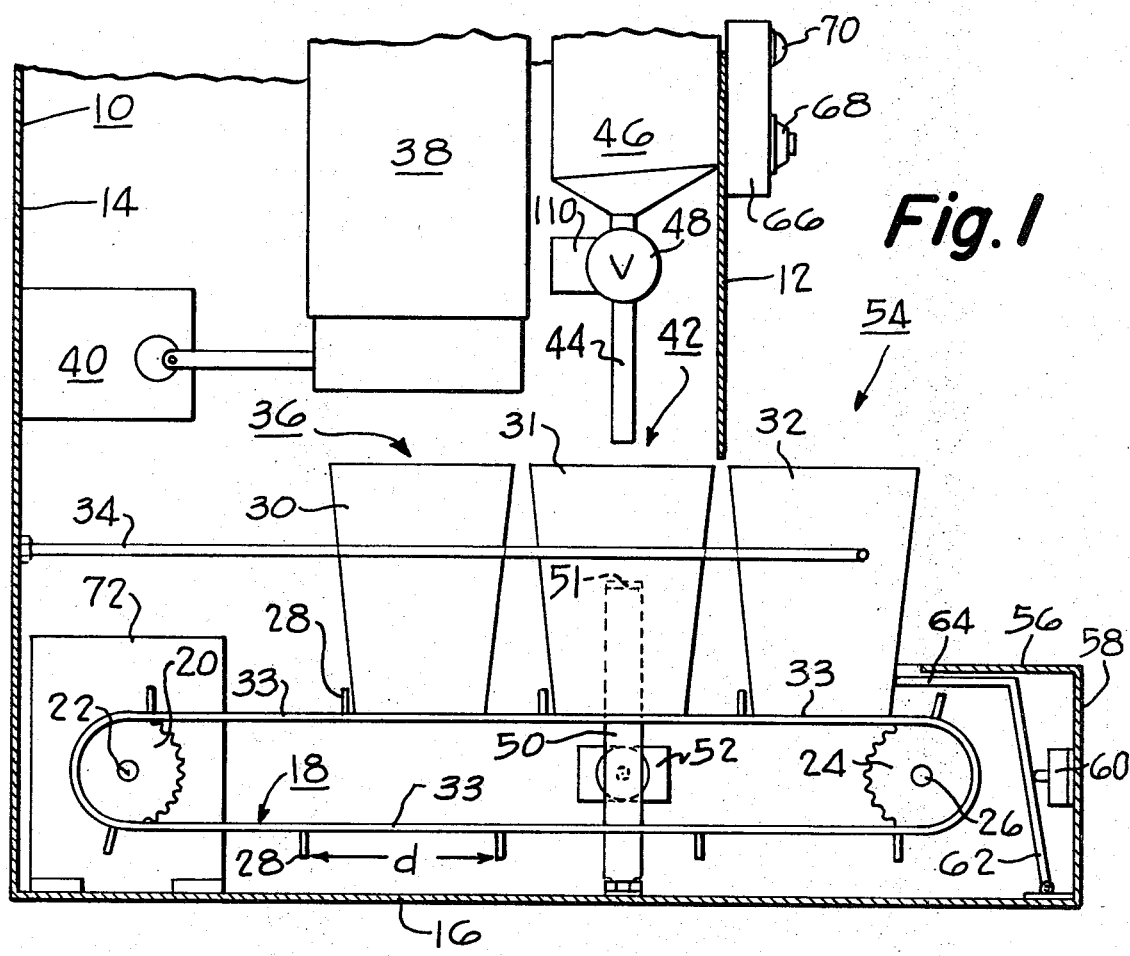
FIG. 1 is a side elevation view of an automatic beverage dispensing system embodying this invention.

The dispensing apparatus of FIG. 1 may be mounted on the serving counter of a cafeteria-style serving line or on the corner of a snack bar at which a customer can move at random to any part thereof. While the dispensing apparatus is intended primarily for use in such self-service situations, it may also be used in any other beverage serving application. A separate dispensing unit such as that illustrated in FIG. 1 is provided for each type of beverage to be served, and such units are employed for hot as well as cold beverages. It is contemplated that ordinarily a series of such units are so mounted next to each other to serve the various beverages that are desired.

Figure 5:
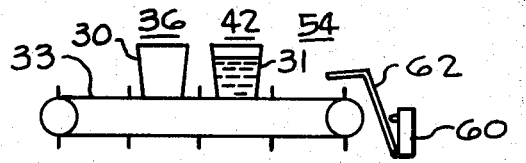

Reference is made to FIGS. 3 and 4—7 in describing the operation of the automatic mode. The normal or quiescent condition of the system is that shown in FIG. 4, in which the conveyor carries a filled cup 32 at the pickup station, a filled cup 31 at the filling station 42, and an empty cup 30 at the supply station 36. The selector switch 98 is in the position illustrated in FIG. 2. When cup 32 is removed by a customer, as indicated in FIG. 5, cup-sensing arm 64 is biased away from switch 60 to close that switch and energize motor 74. Lamp 70 is also lit to inform a customer that a beverage is being served. Thereupon, cams 82—88 start to rotate with the motor, and cycle switch 102 closes immediately thereafter, and provides a holding circuit path for energizing motor 74. This is the operating condition represented by the control circuit state illustrated in FIG. 2, and zero time represented by the timing diagram of FIG. 3. Motor 74 rotates driver 78 to engage Geneva 80 and advance it a quarter-revolution and thereby step the conveyor 18 the length d of a cup support 33 to move the filled cup 31 to the pickup station 54 and the empty cup 30 to the filling station 42. The cup sensing arm 64 is retracted to open switch 60, and the system is in the condition illustrated in FIG. 6.

Figure 7:
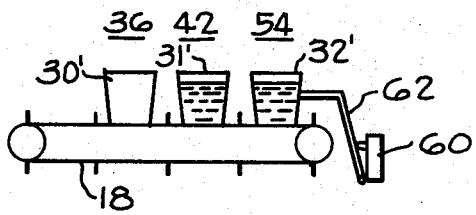

The motor 74 continues to be energized via closed switch 102 for driving the control cams to complete the cycle, while driver 78 is disengaged from the Geneva 80, and the latter and conveyor 18 are stationary. Shortly after conveyor 18 stops, cam 86 closes switch 108 for a short period to energize cup-drop motor 40, which actuates the dispenser mechanism 38 to drop a cup 30' at the supply station 36 (FIG. 7). At the same time, cam 88 closes switch 112, and since cup-sensing switch 52 is closed by the presence of an empty cup 31' at filling station 42, solenoid 110 is energized to open the valve 48, and beverage is fed from the tank 46 through the spout 44 to fill the cup 31' at that station. Cam 86 closes switch 108 for a time sufficient to operate the dispenser mechanism. Cam 88 similarly closes switch 112 for a time sufficient to dispense the desired amount of beverage into the cup at the filling station, then cam 88 opens switch 112 to deenergize solenoid 110 and close valve 48, which action terminates the filling operation. Thereafter, cam 82 opens switch 102 and motor 74 stops to complete the cycle of operation, and the three cups 30', 31' and 32' are in the conditions illustrated in FIG. 7, which are the same as the normal conditions shown in FIG. 4. The system remains in this quiescent condition until the cup 32' at pickup station 54 is removed, whereupon the cycle is repeated in the manner described.

Figure 6:
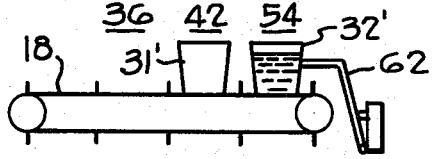

After the filled cup 32' is moved to the pickup station in the condition illustrated in FIG. 6, the cup at the pickup station 54 is available for removal while the next cup 31' is being filled. If it is removed, the switch 60 is closed when the filling operation is completed for cup 32', and the motor 74 remains energized via switch 60 even though cycle switch 102 is opened during the dwell, or inactive, section of the cam 82. Accordingly, motor 74 continues to rotate driver 78 to re-engage Geneva 80 and step the conveyor, and the third filled cup 31' is thereupon conveyed to the pickup station 54 where it may be removed by a customer, while the remainder of the automatic cycle is repeated. Thus, starting at zero time (FIG. 3), after a first filled cup 32 is removed by the customer, almost immediately (for example, after about 1 second) the succeeding filled cup 32' is available at the pickup station 54 for removal. Thus, in about the time it takes for the customer to place the first filled cup 32 on a tray or on platform 56, the second filled cup 32' is conveyed to station 54 and can also be removed. Thereby, for the relatively common occurrence of a customer desiring two cups of beverage, the system automatically supplies the filled cups within the time it takes for the customer to handle them. If the second filled cup 32' is removed during the filling operation for cup 31', the latter is filled and conveyed to the customer pickup station within the short cycle time (for example, about 5 seconds). The system serves successive customers within the time it takes for them to pick up a beverage cup and move along a serving line in a cafeteria, and any customer may serve himself with more than one cup without significant delays. No supervision or handling of the apparatus by an attendant is required to serve a large number of customers during the peak demand periods for which the automatic cycling is used. Substantially no wastage is involved since a large number of beverage cups need not be filled in anticipation of the peak demand, and when demand starts to slacken the operation may be switched to the manual mode, as described below.

The dispensing unit is placed in operation by closing the master switch 90, which initiates the automatic cycling described above. Where no cups are on the conveyor, a first empty cup is dropped during the first cycle, but no filling operation is performed due to sensing arm 50 opening switch 52 in the absence of a cup at station 42. Successive cycles are automatically repeated as described above until a filled cup 32 is conveyed to the pickup station to operate sensing arm 64 and operate switch 60. Thereupon, the system is in the normal condition illustrated in FIG. 4 for the repeated-cycling automatic mode.

Figure 8:
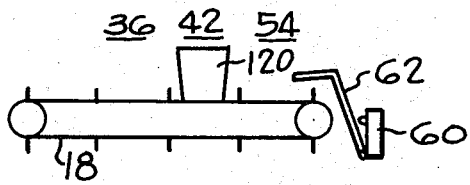
FIGS. 8, 9 and 10 are schematic diagrams illustrating various conditions of the system of FIGS. 1 and 2 in the single-cycle mode.
Figure 9:
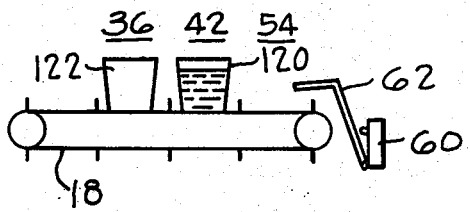

In the single-cycle manual mode, the normal or quiescent condition of the system is that illustrated in FIG. 8 with a single, empty cup 120 on the conveyor 18 at filling station 42. Mode selector switch 98 is operated to connect poles 96 and 106 to contacts 114 and 113, respectively, and cams 84, 86 and 88 are in the rotary positions to open switches 116, 108 and 112, respectively (*i.e.* their cam followers are at the trailing portions of the dwell sections of the respective cams so as to be moved on to the active section to close these switches upon rotation of the cams). The cycle is initiated by a customer actuating momentarily the manual switch 68, the closure of which completes the energization circuit for motor 74, so long as there is no cup present at the pickup station to open switch 60. At the same time, lamp 106 is lit, and with an appropriate sign or legend on a transparent cover for the lamp, a customer is advised that the beverage is being served. Motor 74 rotates the cams in the manner described above, and cam 84 immediately closes cycling switch 116 to provide a holding circuit for the remainder of the manual cycle. At the same time, switch 108 is closed and an empty cup 122 is dropped at station 36, and switch 112 is closed to initiate the filling of cup 120 at station 42, as shown in FIG. 9.

Figure 3:
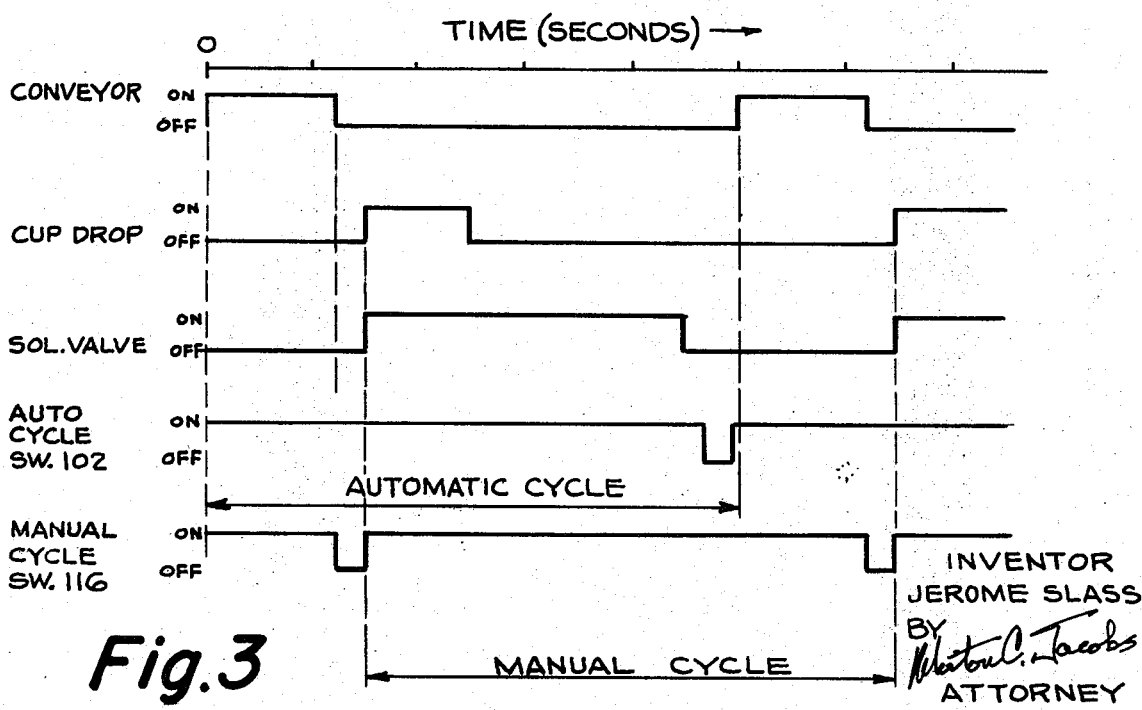
FIG. 3 is an idealized graphical diagram of time relationships of the control system of FIG. 2.
Figure 4:
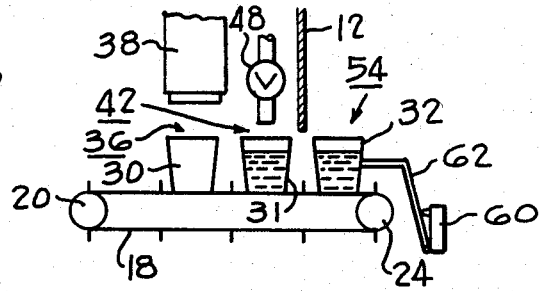
FIGS. 4, 5, 6 and 7 are schematic diagrams illustrating various conditions of the system of FIGS. 1 and 2 in the repeated-cycling mode.
Figure 10:
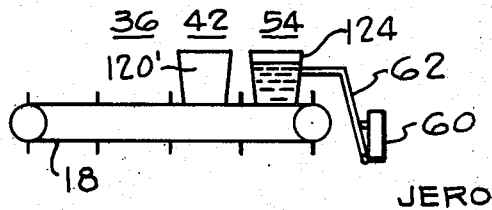

The time relationships indicated in FIG. 3 are followed generally in the manner described above, except that the cycle switch 116 is connected in the control circuit 73 to control the manual cycle, which starts with the closure of that switch. After cup 120 is filled, driver 78 engages the Geneva 80 and the conveyor 18 is stepped to move the cups to the succeeding stations. The dwell section of cam 84 opens the cycle switch 116, motor 74 stops, and the cycle terminates. As shown in FIG. 10, a filled cup 124 is then at the pickup station 54 and an empty cup 120' at the filling station 42. Upon removal of the filled cup 124, the system is in the normal condition of FIG. 8, and another cycle can then be initiated by actuating the manual switch 68 in the manner described above. In the single-cycle mode, the system is normally in condition to immediately start filling the empty cup 120 upon actuation of the manual switch 68. The overall cycle time is the same as that of the automatic cycle, so that a requested beverage is freshly served almost immediately.

To initiate the single-cycle mode with no cups on the conveyor, it is merely necessary to actuate the manual switch 68. In a single cycle, a cup is dropped at station 36, and the conveyor is stepped to move it to filling station 42. The system is then in the normal condition of FIG. 8 and ready to operate in the manner described. Upon changing over from the automatic to the manual mode with the operation of selector switch 98, the system starts with the condition of FIG. 4, and the cams in the approximate rotary positions of FIG. 2. After removal of filled cup 32 at the pickup station 54 which closes sensing switch 60, motor 74 is energized via the then-closed cycle switch 116. The motor continues to operate to step the conveyor and carry the filled cup 31 to the pickup station 54, whereupon the cycle switch 116 opens and the system is in the condition of the end of a single cycle as shown in FIG. 10. Upon operation of selector switch 98 to change over from the single-cycle mode to automatic, the system starts with the condition of FIG. 8 and with cam 82 in a rotary position to hold cycle switch 102 closed. The system is then in the midst of an automatic cycle; an empty cup similar to cup 122 (FIG. 9) is dropped and cup 120 is filled to complete the automatic cycle. The system condition then corresponds to FIG. 5, *i. e.* without a filled cup at pickup station 54. Accordingly, another automatic cycle is performed to place the system in the normal condition of FIG. 7.

Thus, the system may be readily used in either the repeated-cycling automatic mode or the single-cycle manual mode, and the mode may be selected merely by throwing a switch, depending on the load demand of the establishment at any time. One attendant can service a large number of dispensing units (and perform other duties as well), and during operation in any particular mode the only attention required of an attendant is to refill the cup dispenser or beverage supply tanks as may be required. The basic system may be used for both hot and cold beverages, with appropriate heating or refrigeration apparatus being provided as needed, in a manner known in the art.

In a modified form of conveyor 18' (FIG. 11), instead of a belt, a stationary cup platform 126 is used, on which the cups are dropped and along which they slide. The conveyor action is furnished by a pair of parallel chains 128 driven by the conveyor motor 130 and sprocket wheels 20' and 24', and across which are adjustably connected the pusher bars 28'. The cups 30—32 drop between the chains, which guide the cups laterally, similarly as the rails 34, and between adjacent bars 28'. The bars 28' are stepped with the chains and push the empty and filled cups along the platform from one station to the next in the manner described above. The spacing of bars 28' may be adjusted to accommodate various sizes of cups and various amounts of conveyor stepping for different systems.

The cams in FIG. 2 are set to open and close the associated switches in certain time relationships generally indicated in FIG. 3 for one embodiment. The conveyor advance may be considered as a reference for a 360° cycle, and is initiated at 0° and continues to 90°; the manual-cycle switch opens at 90° for about 20° and closes at about 110°; cup-drop switch 108 closes at about 110° and opens at about 180°, and valve switch 112 closes at about 110° and opens at about 325°; repeated-cycling switch 102 opens at about 335° for about 20° and closes at about 355°. These relationships are illustrative and vary depending upon the types and characteristics of components that are employed in the system, and tolerances that are required, for example, due to variations in conveyor stopping time. The cycle time in the illustrated embodiment is about 5 seconds, with the longest segment being that of a filling time of about 3.5 seconds. The cycle time can be lengthened where suitable, and shortened if desired, for example, by filling the cup faster. This may be done suitably by delivering the beverage through a plurality of parallel spouts. The cup-supply segment of the cycle may be conveniently performed during any part of the longer cup-filling operation, which is when the conveyor is always stationary. Mechanisms for dropping the cup on a stationary conveyor are generally simpler than those for supplying a cup to a moving conveyor, and it is therefore preferred that the cup-supply operation be performed at the stationary time since the overall cycle time is unaffected.

The system of this invention may employ various types of control mechanisms known in the art for producing the timing and control operations in the repeated-cycling and single-cycle modes. That is, in each mode a cycle consists of a conveyor-advance segment and a cup-supply and a cup-fill segment, with the conveyor-advance segment preceding or following the other and the control circuit determining the sequence of the two segments depending upon which mode is selected. The Geneva mechanism permits the use of a single motor for timing and for driving the conveyor a predetermined distance. If desired, a separate conveyor motor may be employed together with an additional timer cam which is driven by the timing motor and which opens and closes a switch that controls the period of motor energization from 0° to less than 90° in the illustrated cycle. Thereby, the conveyor stepping time in the cycle can be independently varied. In one form of such a modification, FIG. 11, the timer motor 74 and cams 82—88 take generally the same form as that of FIG. 2. The conveyor motor 130 is energized via a switch 132 of a relay 134 when energized, which in turn is energized via the switch 136 operated by the additional timer cam 138 at the appropriate point of the cycle. A holding circuit for the relay 134 includes another of its switches 140 in series with a conveyor-indexing switch 142. The latter is fixed in position and is actuated, as indicated by broken line 144, by projecting elements on the conveyor chains 128 (or on the belt 18) which are uniformly spaced and which may be the pusher bars 28', whereby the holding circuit for the relay is opened by each pusher bar successively engaging the prefixed indexing switch, and the conveyor is stopped in the proper location.

Alternatively, the timer motor and cam operated switches may be replaced by relays (electromechanical or electronic), together with timing or other control circuits for timing and controlling the various segments of the operating cycle and for establishing their sequential order in accordance with the repeated-cycling and single-cycle modes. Photoelectric switches may be used for cup sensing in place of switches 52 and 60. The control circuit may be constructed as known in the art so that the completion of the first segment of the cycle sets a switch to initiate the succeeding segment, with the initiation of the first segment being controlled by the operation of a cup-sensing switch at the pickup station or of the manual switch depending upon which mode is selected. With this type of control circuit, the timing of each segment can be adjusted independently of the others so that a wide variety of different beverages and cup sizes can be handled with a single dispensing unit. For example, the system may employ an additional filling station for supplying ice for cold drinks at one such station, and another for partially filling the cup with beverage so as to shorten the overall filling time for the automatic cycle. A cup-sensing switch is provided at each such filling station. In the automatic mode, the control operation is generally the same as described for the illustrated embodiment, with the conveyor stepping once for each cycle and the appropriate operations taking place concurrently at the various stations while the conveyor is stationary. In the manual mode, the control cycle includes a stepping of the conveyor to each filling station and the performance of the appropriate filling operation when a cup is at the station, and the cycle terminates with the delivery of a filled cup at the pickup station. The cup-drop operation is enabled only when a cup is sensed at the final filling station, whereby the empty cup is at the first filling station when the cycle concludes, and the next cycle starts with the filling of that cup.

Various types of cup dispensing mechanisms suitable for use in this system are well known in the art. For example, the rotating turret type may be used, in which a plurality of cup stacking cylinders are provided with one cylinder automatically rotating into operating position to replace another when its cup supply is ended. This operation may be interlocked with the control circuit of FIG. 2 to take place at the end of a cycle and to prevent the start of another cycle until it is completed. Various types of suitable cup-filling mechanisms are well known in the art. These mechanisms, such as those used in vending machines, supply all of the necessary ingredients for any particular beverage at a single filling station. Thus, crushed ice may be supplied for cold beverages and cream for coffee. The tank 46 may contain a pre-mixed beverage or a plurality of tanks may supply the separate ingredients, such as syrup and water, of a beverage, with separate spouts and valves which deliver the ingredients concurrently or which may be operated seriatim. The details of construction of such mechanisms and the associated devices and controls are well known in the art, and it will be appparent how they may be employed from the foregoing description.

In practice, the dimensions of the unit are determined by the requirements of the installation facilities as well as by the dimensions of the cup-supply mechanism and filling tanks and apparatus. Generally, most installations will find it desirable to minimize the width of the unit (e.g. about 1 foot) as viewed from the front, due to the limited counter space that is generally available. Accordingly, the proportionate depth of the unit as viewed in FIG. 1 is increased as required (e.g. about 4 feet) to accommodate the various apparatuses that are used. The spacing $d$ between pusher bars 28 is also proportionately greater than indicated in FIG. 1 (which presents the general relationship of parts of the system) and is primarily determined by the locations of the operating stations 36, 42, 54, as well as by the sizes of the cups that are used.

As indicated above, the pusher bars 28 or 28' are adjustably attached to the conveyor belt 18 or chains 128, whereby the spacing $d$ may be selected (e.g. from 8 to 16 inches) in accordance with the type of beverage and the size of cups that are employed. In the embodiment of FIG. 2, the motor speed, the timer cams and their time relationships are determined to produce the desired conveyor stepping and to synchronize the various operations. In the modified embodiment of FIG. 11, the conveyor stepping distance is adjustably determined by the positions of the pusher bars 28' and is the same as the spacing therebetween. That is, each of the bars 28' in succession actuates switch 142 to terminate the stepping segment of each of the successive operating cycles. Thus, in some forms of the invention, the distance between stations is very much greater than that indicated in FIG. 1, and the period of the operating cycle and of its segments may be substantially greater than that indicated in FIG. 3.

Thus, this invention provides a new and improved automatic beverage dispensing system suitable for self-service use in cafeteria-style and snack-bar establishments to meet the varied requirements of both peak and low-demand periods. The system may be used in amusement parks, sports stadiums, theatres, drive-in restaurants, and snack bars and industrial feeding areas. In addition to customer self-service, the system may be used to assist attendants in serving customers, whereby the time-consuming dispensing operation is eliminated and the attendant need only remove filled cups in the repeated-cycle mode or push switch button 70 in the single-cycle mode.

While the invention has been particularly shown and described by reference to a preferred embodiment thereof, it will be apparent to those skilled in the art that various changes may be made therein without departing from the spirit and scope of the invention.

I claim:

1. In a beverage dispensing system comprising:
    a conveyor;
    means for dispensing empty cups to said conveyor;
    means for feeding beverage to said cups at a filling station;
    means for advancing said conveyor to move filled cups from said filling station to a pickup station;
    the combination therewith of:
        control means having a control cycle including a cup-filling segment and a conveyor-advance segment;
        selector means for switching said control cycle alternatively to a repeated-cycle mode and to a single-cycle mode;
        manually operative switch means;
        means responsive to the operation of said manual switch means in said single-cycle mode, and operative in said repeated-cycle mode upon completion of said conveyor-advance segment, for initiating operation of said beverage feeding means during said cup-filling segment; and
    means responsive to the removal of a filled cup from said pickup station in said repeated-cycle mode, and operative in said single-cycle mode upon completion of said cup-filling segment, for initiating operation of said conveyor-advancing means, whereby each time a filled cup is removed in said repeated-cycle mode another filled cup is automatically advanced to said pickup station, and in said single-cycle mode the operation of said manual switch initiates the filling of a cup and its advance to said pickup station, and by the operation of said selector means either of said modes may be selected and each mode may be changed to the other.

2. A beverage dispensing system as recited in claim 1, wherein said empty cups are supplied to said conveyor at a cup station spaced from said filling station by a distance equal to that between said filling and pickup stations, and said control means includes means for initiating operation of said cup-supplying means during the cup-filling segment of said control cycle, whereby an empty cup is moved to said filling station during said conveyor-advance segment.

3. A beverage dispensing system as recited in claim 1, wherein said means responsive to the removal of a filled cup includes switch means for sensing the presence and absence of a cup at said pickup station.

4. A beverage dispensing system as recited in claim 3, wherein said means for initiating operation of said beverage feeding means includes switch means for sensing the presence and absence of a cup at said filling station.

5. In a beverage dispensing system comprising:
    a conveyor;

means for dispensing empty cups to said conveyor at a cup station;

means for filling said cups at a filling station; and means for driving said conveyor to move empty cups to said filling station and filled cups to a pickup station; the combination therewith of:

control means responsive to the removal of a filled cup from said pickup station for initiating operation of said conveyor driving means to carry said empty and filled cups respectively to said filling and pickup stations and for thereafter initiating operation of said cup dispensing means and of said cup filling means when said conveyor is stationary, whereby each time a filled cup is removed another filled cup is automatically moved to said pickup station.

6. A beverage dispensing system as recited in claim 5, wherein said control means includes means for initiating said conveyor operation and thereafter said cup filling operation.

7. A beverage dispensing system as recited in claim 6, wherein said control means includes means for initiating said cup supplying operation concurrently with the performance of said cup filling operation.

8. A beverage dispensing system as recited in claim 5, wherein said control means includes switch means for sensing a cup at said pickup station and the absence thereof, and means for connecting said switch means in a circuit to control the energization of said conveyor driving means.

9. A beverage dispensing system as recited in claim 8, wherein said control means includes manually operative switch means, means responsive to the operation of said manual switch means for initiating operation of said cup filling means and thereafter said conveyor driving means, and switch means for selectively actuating said control means to be responsive alternatively to said manual switch means and to said cup sensing switch means.